Figure 1:
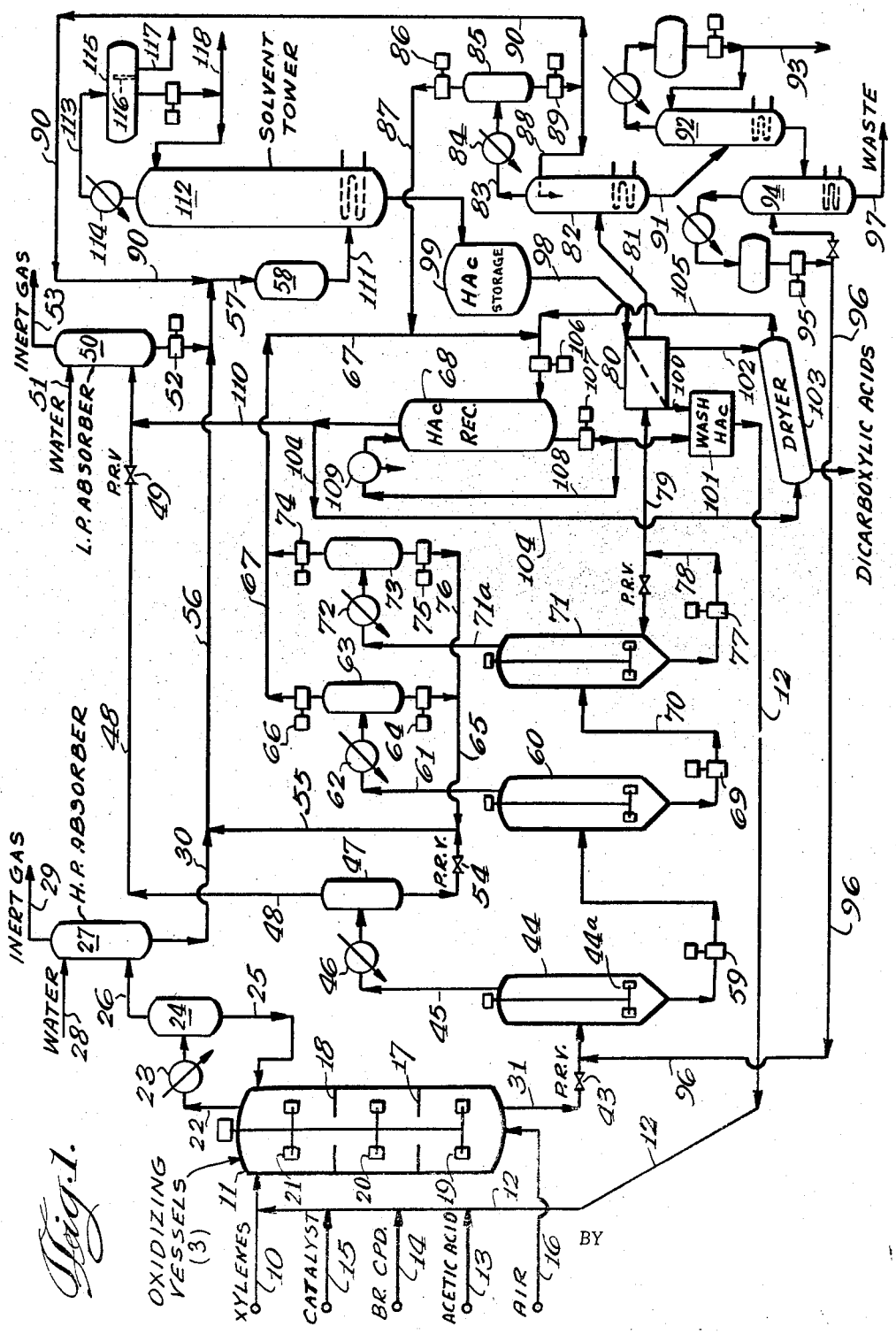

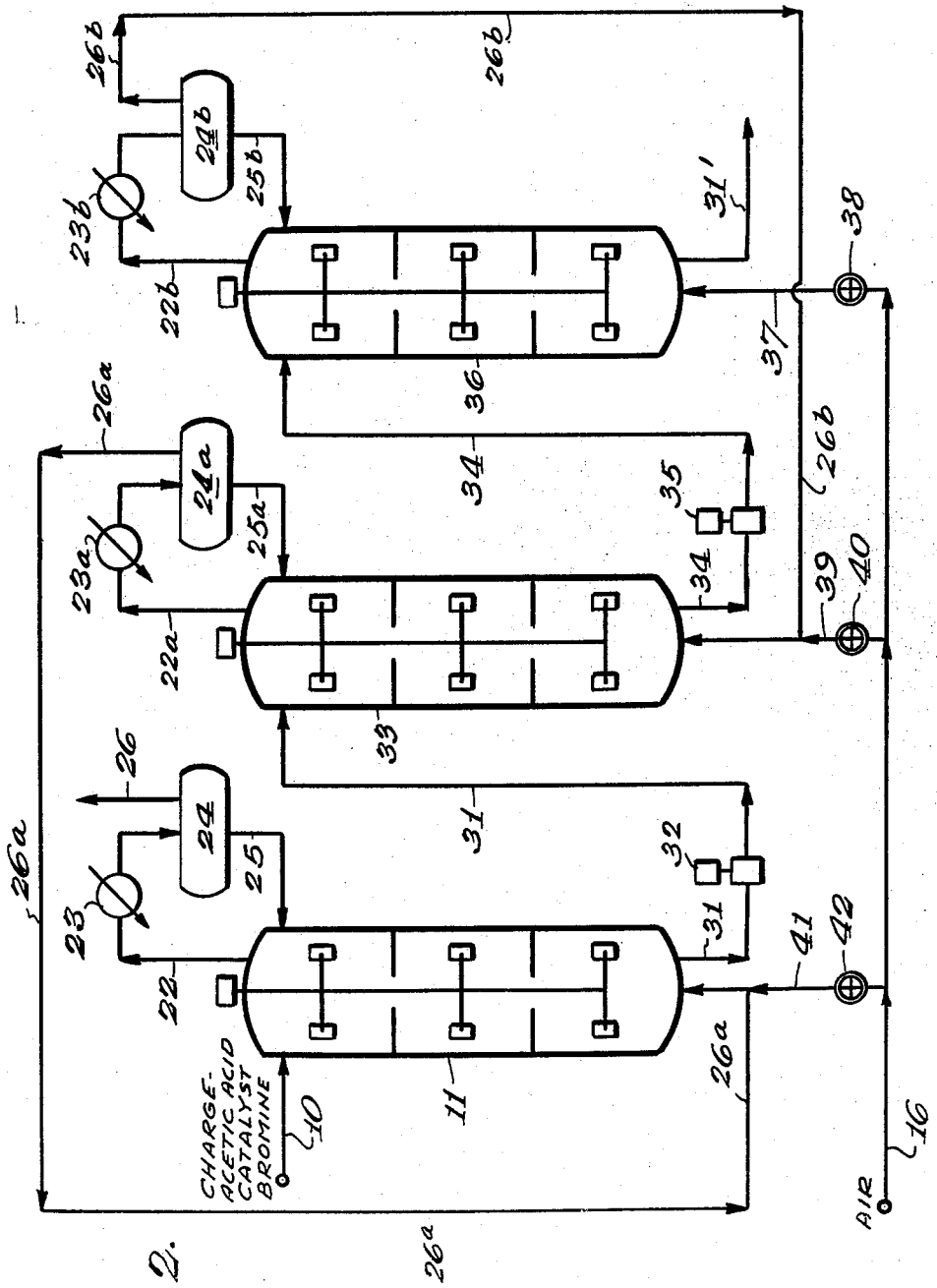

United States Patent Office 2,962,361
Patented Nov. 29, 1960

2,962,361

CONTINUOUS OXIDATION SYSTEM FOR PRODUCING CARBOXYLIC ACIDS

Charles A. Spiller, Jr., Maplewood, N.J., Richard H. Baldwin, Chicago, Ill., and Charles D. Kalfadelis, Hammond, Ind., assignors to Standard Oil Company, Chicago, Ill., a corporation of Indiana Filed Aug. 12, 1957, Ser. No. 677,449

5 Claims. (Cl. 23—260)

This invention relates to an improved oxidation system for producing at least one carboxylic acid product from an aromatic charging stock having at least one oxidizable substituent. The invention will be described as applied to a system for oxidizing mixed xylenes to obtain dicarboxylic acids.

It is known that aromatic hydrocarbons having at least one and preferably two or more oxidizable substituents may be converted into carboxylic acid products by effecting the oxidation under carefully controlled conditions in the presence of a suitable solvent such as a mono-basic aliphatic acid reaction medium of 2 to 6 carbon atoms such, for example, as acetic acid, and also in the presence of known oxidation catalysts such as manganese and/or cobalt, preferably in the form of soluble carboxylic acid salts, and also in the presence of a bromine-affording material. The desirability of effecting such oxidation in a continuous manner has been recognized but heretofore no one has succeeded in developing such a continuous process on a commercial scale. The object of this invention is to provide an improved commercial oxidation system which is sufficiently flexible so that it may be employed for oxidizing a wide variety of charging stocks but which is particularly suitable for converting mixed xylenes to mixed dicarboxylic acids in such a form that they may be readily separated into substantially pure phthalic acid (or anhydride), isophthalic acid, and terephthalic acid, respectively. A particular object is to provide a stagewise continuous countercurrent oxidation system which will avoid explosion hazards and result in the attainment of product quality and yields comparable or even superior to those attainable in batch processes. A further object is to provide an integrated system for handling and removing water produced in the oxidation steps and for utilizing the solvent or acid reaction medium most effectively. Other objects will be apparent as the detailed description of the invention proceeds.

In practicing the invention the aromatic charging stock which preferably has two or more oxidizable substituents may be introduced into the upper part of a continuous multistage oxidation system into which are also introduced about 1 to 5 volumes of a solvent such as a mono-basic aliphatic acid reaction medium having 2 to 6 carbon atoms per molecule (preferably acetic acid), oxidation catalysts, a bromine-affording substance as hereinafter described. The oxygen-containing gas may be introduced into the countercurrent system at the opposite end from that at which charging stock is introduced. In some cases it may be possible to effect the countercurrent oxidation in a single vessel provided with a plurality of intermediate mixing stages, the heat of reaction being removed by boiling reaction medium and water from the vessel, condensing withdrawn vapors and returning the condensate. The oxygen concentration in the withdrawn gasiform stream, particularly in the condenser and in the receiver, should not exceed about 8 to 9 percent in order to avoid possible explosion hazards; the countercurrent system is particularly advantageous in that it enables practically quantitative oxygen utilization with minimum hazard and without substantial detriment to product yield or quality.

For most effective countercurrent contacting a plurality of oxidation vessels are employed in series, the highest oxygen concentration (e.g. air or oxygen-enriched air) being introduced at the final stage, the off-gases from each stage being returned to the preceding stage while the partially oxidized products move from the first stage to the final stage. In such systems the amount of oxygen in gases leaving each and all of the stages must be below about 8 percent and sufficient air is introduced into the gas stream which is passed into the earlier stages to supply the amount of oxygen required therein. It is desirable that the final oxidation stage be at the highest temperature, pressure and oxygen concentration, and it is also desirable that the amount of water in the acid medium should not substantially exceed about 20 weight percent. While for optimum yields and product quality it is desirable to minimize the amount of water in the final oxidation stage, it has been found that remarkably complete conversion into high quality product can be attained in systems wherein the solvent, such as acetic acid, is not less than about 80 percent in the final stage. In a staged three vessel countercurrent oxidation system the first stage should be operated at 50–300, e.g. 175 p.s.i., 320–420, e.g. 375° F., with a 1:1 to 5:1 acetic acid to hydrocarbon ratio and for a time of about .1 to 1 hour, e.g. 30 minutes. The second stage should be at a higher pressure than the first, i.e. 100–400 or about 300 p.s.i., at approximately the same temperature, e.g. 340–420 or about 380° F., with about the same solvent ratio and contact time as the first stage but preferably with a somewhat higher oxygen concentration. The last stage should be at the highest pressure, e.g. 200–500 or about 400 p.s.i., the highest temperature, e.g. 360–440 or about 400° F., and at the highest oxygen concentration, preferably air at the inlet side but in amounts to avoid exceeding 8 percent oxygen in the off-gas therefrom.

The oxidation product from the final stage is next introduced into a plurality of crystallizing zones, recycled phthalic acid or anhydride or other components recovered from the mother liquor preferably being added to the oxidized stream entering the crystallizing system. The particular steps and conditions for obtaining optimum crystallization will be dependent, of course, upon the nature of the charging stock and of the desired products and, in the case of mixed xylenes obtained from hydroformed naphtha by solvent extraction, it is desirable that the first crystallization stage be at a pressure of about 75 p.s.i.g. (plus or minus 15 to 20 p.s.i.) at a temperature of about 350° F. for crystallizing terephthalic acid and nucleating isophthalic acid; that the second crystallizer be operated at about 2 p.s.i.g. at about 235° F. for crystallizing isophthalic acid and nucleating phthalic acid, and that the final crystallizer be under relatively high vacuum of the order of 100 to 110 millimeters of mercury absolute at a temperature of about 140° F. for crystallizing phthalic acid without crystallizing benzoic acid. By operating in this manner each of the three dicarboxylic acids is separated in crystals of such size and uniformity that all of the mixed acids may be readily separated from mother liquor by centrifuging and the separated acids, after being washed with acetic acid and dried, may subsequently be separated into substantially pure individual dicarboxylic acids by an aqueous separation technique which minimizes corrosion problems. Gasiform and aqueous acid streams are produced in various parts of the system and it is important that an integrated system be provided for handling them most effectively.

Further objects and aspects of the invention will be apparent from the following detailed decription of a specific example thereof read in conjunction with the accompanying drawings which form a part of this specification and in which:

Figure 1 is a schematic flowsheet of our improved continuous mixed xylene oxidation system, and Figure 2 is a diagrammatic representation illustrating a preferred flow for a continuous, multi-vessel, stage-countercurrent oxidation system.

The invention will be described as applied to the conversion of about 6000 pounds per hour of a mixed xylene charging stock to about 7500 pounds per hour of mixed dicarboxylic acids and about 500 pounds per hour of benzoic acid. The mixed xylene charge is introduced by line 10 to oxidizing vessel 11 at the rate of about 14 gallons per minute. The oxidizing vessel illustrated in Figure 1 diagrammatically illustrates a staged countercurrent oxidizing system which is described in further detail in Figure 2. Acetic acid of at least about 95 percent concentration is introduced through line 12 and any required make-up acetic acid may be introduced through line 13, the total acid introduction in this example being at the rate of about 20 gallons per minute. If make-up acetic acid contains appreciable amounts of water or other impurities, it is preferably introduced into a solvent fractionating still downstream in the system as will be later described. About 17 pounds per hour of ammonium bromide is introduced by line 14 and about 45 pounds per hour of manganese acetate is introduced in solution through line 15. Air is introduced through line 16 at the rate of about 7650 standard cubic feet per minute.

No novelty is claimed per se in the catalyst or in the catalyst promoter employed in this invention since the invention is an improvement in a particular promoted catalyst system recently perfected by others. The catalyst is a multi-valent or heavy metal, preferably in a form which is soluble in the reaction medium or solvent. The catalyst metal may advantageously be selected from the group consisting of manganese, cobalt, nickel, chromium, vanadium, molybdenum, tungsten, tin, cerium, or mixtures thereof, and the metal may be employed in elemental, combined, or ionic form, preferably in the form of acetate when the reaction medium or solvent is acetic acid. The promoter is a substance-affording bromine, the bromine being in elemental, ionic, organic or inorganic form. Thus the bromine may be employed in the form of potassium bromate, ammonium bromide, benzyl bromide, tetrabromoethane, manganese bromide or the like. The proportions of catalyst and promoter may be approximately stoichiometric as exemplified by manganese bromide and generally are in the range of 1:10 to 10:1 atoms of catalyst metal per atom of bromine. The amount of catalyst employed is usually in the range of about .01 to 10 percent or more and is preferably in the range of about .2 to 2 percent by weight based on aromatic hydrocarbon reactant charged. The preferred mixed metal catalysts are mixtures of manganese in the form of bromide or acetate with ammonium molybdate, ammonium chromate, tungstic acid, cobalt acetate, or the like, the proportions usually being about 1 to 2 parts by weight of the manganese salt per part by weight of the other metal compound. Alternatively, of course, the catalyst metals may be employed as salts of an acid which is being produced in the system.

It may be possible to effect the desired oxidation counter-currently in a single oxidizing vessel, particularly if the vessel is divided into a plurality of zones by baffles 17 and 18 and provided with impeller type mixers 19, 20 and 21 in the three zones. Inert gas and vapors are withdrawn from the top of the oxidizing vessel through line 22 to cooler or condenser 23 and thence to receiver 24, the condensate being returned preferably by gravity feed through line 25 to the oxidizing vessel and the uncondensed inert gas being introduced by line 26 at the base of high pressure absorber 27 wherein it is scrubbed with about 560 pounds per hour of water introduced through line 28 for recovering acetic acid from inert gas which is vented to the atmosphere through line 29. Acid-containing water is withdrawn from absorber 27 through line 30.

For best results at least two, and preferably three, separate oxidizing vessels are employed as illustrated in Figure 2. The liquid charging stock, reaction medium, catalyst and bromine-affording material are introduced by line 10 to the first vessel 11 and the partially oxidized product which is withdrawn from the first vessel through line 31 is introduced by pump 32 to the upper part of second oxidizing vessel 33. Similarly, the incompletely oxidized product leaving vessel 33 by line 34 is introduced by pump 35 to final oxidizing tower 36. In this multi-vessel system air or oxygen-enriched air may be introduced at the base of the final vessel 36 through line 37, the amount of oxygen thus introduced being controlled by valve 38 to maintain an oxygen content in the off-gases from vessel 36 below about 8 volume percent. In this example each of the separate oxidizing vessels is provided with its individual vapor outlet conduit, cooler, receiver and liquid return line. Thus inert gas and vapors are withdrawn from vessel 36 by line 22b through cooler 23b and receiver 24b, condensate being returned by line 25b and vapors being withdrawn through line 26b. The gas phase in 23b, 24b and 26b should contain less than 8 percent oxygen and control valve 38 is regulated to prevent the oxygen concentration from exceeding the flammable limit.

The oxidizing gas introduced at the base of vessel 33 may be largely the free oxygen contained in the total gas stream which is introduced by line 26b directly into the base of vessel 33. Additional air or oxygen may be introduced through line 39 in amounts controlled by valve 40, this last named valve regulating the amount of introduced air or oxygen in order to prevent the oxygen concentration in receiver 24a or condenser 23a or line 26a from exceeding 8 volume percent. The total gas stream from line 26a is introduced at the base of reactor 11 for supplying oxidizing gas thereto and, here again, additional air or oxygen may be introduced through line 41 in amounts controlled by valve 42 for preventing the oxygen concentration in receiver 24, condenser 23 or line 26 from exceeding 8 volume percent (it is preferably zero). In this particular example vessel 11 is operated at about 160 p.s.i.g. and 375° F., vessel 33 at about 300 p.s.i.g. and 380° F. while vessel 36 is operated at about 400 p.s.i.g. and at 400° F., the holding time in each of the vessels being about 20 to 30 minutes. It is preferred that a substantial amount of the oxidation occur in each vessel and that the acetic acid concentration in each vessel be at least about 80 percent by weight, maximum yields being obtained if water is removed from the final reactor substantially as fast as it is formed. Some water and solvent is of course recycled from each of the latter reactors to the next preceding reactor along with the gas stream and a portion of the water of reaction is ultimately removed from the oxidizers through line 26 along with a certain amount of acetic acid which is recovered in tower 27 as hereinabove described.

Whether the oxidation is effected in one, two or three vessels, the oxidized product stream withdrawn through line 31 (or 31′) is passed through pressure-reducing valve 43 or a metering pump or transfer means into the first stage crystallizer 44 which in this case is operated at 75 p.s.i.g. and 350° F. while the contents of vessel 44 are constantly agitated by impeller-mixer 44a. The vapors withdrawn through line 45 are partially condensed in cooler 46 and introduced into receiver 47. Vapors from receiver 47 are passed through line 48 and pressure-reducing valve 49 to low pressure absorber 50 where they are scrubbed by water introduced through line 51, the acid-enriched water being pumped out of the absorber by pump 52 and inert gas vented through line 53. Condensate from receiver 47 is passed through pressure-reducing valve 54 and lines 55, 56 and 57 to surge tank 58.

In vessel 44 the defined conditions effect crystallization of terephthalic acid and the seeding of isophthalic acid and a holding time in this vessel of about an hour or more may be required to obtain crystals of desired size and separability. The slurry from vessel 44 is introduced through pressure-reducing valve, metering pump or other transfer means 59 to the second crystallizing vessel 60 which is operated in this case at 2 p.s.i.g. and 235° F. for crystallizing the isophthalic acid and seeding phthalic acid, the holding time in vessel 60 being about the same or slightly longer than that in vessel 44. Vapors withdrawn through line 61 are condensed in cooler 62 and introduced into receiver 63 from which condensate is passed by pump 64 and lines 65, 55, 56 and 57 to surge tank 58. Uncondensed vapors from receiver 63 are introduced by compressor 66 and line 67 to an acetic acid recovery scrubber 68.

The slurry from vessel 60 is passed through pressure release valve or metering means 69, line 70 to the final crystallizer 71 which in this case is operated at 110 millimeters of mercury pressure and at a temperature of 140° F., vapors being withdrawn through line 71a, cooler 72 and receiver 73 by means of vacuum pump or ejector 74 which discharges said vapors into line 67. Condensate from receiver 73 is introduced by pump 75 and lines 76, 65, 55, 56 and 57 to surge tank 58. In vacuum vessel 71 as much of the phthalic acid is crystallized which can be separated without effecting crystallization of benzoic acid.

The slurry from final crystallizer 71 is passed by pump 77 and lines 78 and 79 to centrifuge system 80 wherein the crystals are separated from mother liquor and subsequently washed with fresh acetic acid from storage vessel 99. Provision (not shown) may be made for recycling a part of the centrifuged mother liquor back to the centrifuge inlet or crystallization tank 71. The net amount of mother liquor may be introduced by line 81 into a separation system diagrammatically represented as a series of stills each provided with a reboiler. In still 82 any phthalic acid will dehydrate and solvent and water are taken overhead through lines 83, cooler 84 and receiver 85, the uncondensed vapors from receiver 85 being pumped by compressor 86 to line 67 and that portion of the condensate which is not returned as reflux through line 88 is introduced by pump 89 and line 90 to surge tank 58. Bottoms from tower 82 are introduced by line 91 to fractionating tower 92 from which benzoic acid is obtained as an overhead stream 93. The bottoms from tower 92 is fractionated in column 94 to give a phthalic anhydride stream which is recycled by pump 95 and line 96 back to crystallizer 44 or alternatively 60. If the phthalic anhydride stream contains toluic acid, it may be sent to oxidizing vessel 11. Waste material is withdrawn through line 97.

After removing mother liquor from crystals in centrifuge system 80 the crystals are washed in the centrifuge with substantially anhydrous acetic acid from line 98 and storage tank 99, this wash acid being discharged from the centrifuge through line 100 to wash tank 101. After this washing step the centrifuged crystals are substantially anhydrous and such crystals are withdrawn through line 102 to dryer 103 wherein acetic acid is removed by hot inert gas which is introduced into the dryer through line 104 and withdrawn through line 105 from which it is introduced by compressor 106 along with gases and vapors from line 67 to acetic acid and entrained solids recovery column 68. Liquid acetic acid is withdrawn from the base of this column by pump 107 and a part of it is circulated through line 108 and cooler 109 back to the top of recovery unit 68 to serve as a scrubbing medium. Inert gas leaves the top of the recovery unit through line 110 which supplies the inert gas for line 104 and discharges the net amount of inert gas to the low pressure absorber 50 as hereinabove described.

From the foregoing it will be seen that surge tank 58 has collected aqueous acetic acid from all parts of the system and this aqueous acetic acid, together with makeup acetic acid if it contains water, is introduced by line 111 to distillation column 112 which is provided with a suitable reboiler at its base. The overhead stream withdrawn through line 113 contains not only water but azeotroped unreacted hydrocarbons, all of which are condensed in cooler 114 and introduced into receiver 115. Any hydrocarbons flow over weir 116 and are withdrawn through line 117. A part of the condensed water may be returned as reflux and the remainder discharged through line 118. The recovered anhydrous acetic acid is introduced from the base of column 112 by line 119 to storage vessel 99.

While the foregoing example has been described in considerable detail with respect to the oxidation of a particular charging stock, it should be understood that the invention is applicable to a large number of different charging stocks and for the production of a large number of polycarboxylic acid products. If a single xylene is employed as a charge instead of mixed xylenes, the crystallization technique may be simplified since the particular system hereinabove described is designed for effecting crystallization of phthalic acid, isophthalic acid and terephthalic acid, in a form which is readily separable from mother liquor and which enables subsequent separation and recovery of these individual dicarboxylic acids in substantially pure form. Examples of oxidizable substituted aromatic hydrocarbons and the acids obtainable therefrom are as follows:

| | |
|---|---|
| Methylbenzene | Benzoic |
| 1,2-dimethylbenzene | Phthalic |
| 1,3-dimethylbenzene | Isophthalic |
| 1,4-dimethylbenzene | Terephthalic |
| 1,2,3-trimethylbenzene | Hemimellitic |
| 1,2,4-trimethylbenzene | Trimellitic |
| 1,3,5-trimethylbenzene | Trimesic |
| 1,2,3,4-tetramethylbenzene | Prehnitic |
| 1,2,4,5-tetramethylbenzene | Pyromellitic |
| 1,2,3,5-tetramethylbenzene | Mellophanic |
| Pentamethylbenzene | Benzenepentacarboxylic |
| Hexamethylbenzene | Mellitic |
| p-Diisopropylbenzene | Terephthalic |
| m-Diisopropylbenzene | Isophthalic |
| 1,3,5-triisopropylbenzene | Trimesic |
| 1,3-dimethyl-5-ethylbenzene | Trimesic |
| 1-methylnaphthalene | α-Naphthoic acid |
| 2-methylnaphthalene | β-Naphthoic acid |
| 3-methylpyridine | Nicotinic acid |

While crystallization is preferably effected by removal of vapors for effecting concentration and/or temperature control, the crystallization may be effected in a scraped surface exchanger provided that it is constructed of a material which will not be corroded or cause product contamination; the use of a scraped surface exchanger offers the advantages of close cooling rate control at nucleation temperatures, cooling rate control for obtaining desired crystal sizes and diluent addition as a crystal control expedient, etc. Alternative operating techniques, steps and conditions will be apparent from the foregoing description to those skilled in the art.

We claim:

1. A continuous countercurrent oxidation system which comprises a plurality of oxidation vessels, each vessel having a vapor outlet leading from the top thereof through a condenser to a receiver and a line for returning liquid from the receiver back to the vessel, means for introducing a charging stock at the upper part of the first vessel, means for pumping liquid from the lower part of the first vessel to the upper part of the second vessel, means for introducing an oxygen-containing gas at the base of the second vessel, a line for returning gas from the receiver of the second vessel to the lower part of the first vessel and means for venting gases from the receiver of the first vessel.

2. The system of claim 1 which includes a third vessel provided with a vapor line leading from its upper part through a condenser to a receiver and a line for returning condensate from said receiver to said third vessel, a line for introducing gas from the receiver of the third vessel to the lower part of the second vessel and means including a line and a pump for introducing liquid from the base of the second vessel to the upper part of the third vessel.

3. An improved system for producing a phthalic acid product from a xylene charging stock, which system comprises an oxidizing vessel, a conduit for introducing xylene charging stock and acetic acid into an upper level of said vessel, a separate conduit for introducing air at the base of said vessel, a cooler, a separator, a conduit for passing vapors from the upper part of the vessel through said cooler to said separator, a conduit for returning condensate from the separator back to the vessel, a first receiving vessel, a conduit including a pressure-reducing valve for conducting material from the base of the oxidizing vessel to said first receiving vessel, a second receiving vessel, a conduit including a metering pump for transferring material from the base of the first receiving vessel to the second receiving vessel, a third receiving vessel, a conduit including a metering pump for introducing material from the base of the second receiving vessel to the third receiving vessel, a centrifuge, a conduit and pump for introducing material from the base of the third receiving vessel to the centrifuge, an acetic acid storage tank, a line leading from said storage tank to the centrifuge to supply wash liquid thereto, a line for returning said wash liquid to said oxidizing vessel, a fractionator and a conduit for conducting mother liquor from said centrifuge to said fractionator, connections for returning an acid stream from said fractionator to said first receiving vessel and separate lines for withdrawing vapors from each of said receiving vessels at rates to control the temperatures therein.

4. An improved system for producing a phthalic acid product from a xylene charging stock, which system comprises means for oxidizing said xylene charging stock to said phthalic acid product in the presence of a solvent, means including a plurality of crystallizing vessels connected in series for crystallizing phthalic acid product from effluent discharged from the oxidizing means, a separator connected to receive a slurry of crystals in mother liquor from the final crystallizing vessel of the crystallizing means, means for fractionating the mother liquor to obtain a first aqueous solvent stream and at least one acid stream, means for obtaining a second aqueous solvent stream from the oxidizing means, a third aqueous solvent stream from the crystallizing means and a fourth aqueous solvent stream from removed crystals, means for combining said aqueous solvent streams and for removing water from the combined stream to obtain substantially dry solvent, and connections for passing said dry solvent to said separator for washing product crystals and thence to said oxidizing means for supplying solvent thereto.

5. An improved system for producing a phthalic acid product from a xylene charging stock, which system comprises means for oxidizing said xylene to said phthalic acid in the presence of a solvent, said oxidizing means including a plurality of stage-countercurrent oxidizing vessels with a pump for pumping liquid from the base of a first vessel to the upper part of a succeeding vessel and a line for passing a gasiform stream from the upper part of said succeeding vessel to the lower part of said first vessel and a line for introducing an oxygen-containing gas at the lower part of said succeeding vessel, means including a plurality of crystallizing vessels connected in series for crystallizing phthalic acid product from effluent discharged from the oxidizing means, a separator for removing crystals from mother liquor, means for fractionating said mother liquor to obtain an acid stream and a phthalic anhydride stream and a recycle line for returning said phthalic anhydride stream to the crystallizing means.

References Cited in the file of this patent

UNITED STATES PATENTS

| | | |
|---|---|---|
| 2,606,820 | Harms | Aug. 12, 1952 |
| 2,673,217 | Hull | Mar. 23, 1954 |
| 2,788,367 | Bills et al. | Apr. 9, 1957 |